United States Patent
Frenger et al.

(10) Patent No.: US 8,639,252 B2
(45) Date of Patent: Jan. 28, 2014

(54) METHOD AND ARRANGEMENT IN A RADIO COMMUNICATIONS SYSTEM FOR SUPPORTING DTX

(75) Inventors: Pål Frenger, Linköping (SE); Robert Baldemair, Solna (SE); Erik Dahlman, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 138 days.

(21) Appl. No.: 13/319,258

(22) PCT Filed: May 8, 2009

(86) PCT No.: PCT/SE2009/050503
§ 371 (c)(1), (2), (4) Date: Mar. 9, 2012

(87) PCT Pub. No.: WO2010/128909
PCT Pub. Date: Nov. 11, 2010

(65) Prior Publication Data
US 2012/0157103 A1    Jun. 21, 2012

(51) Int. Cl.
*H04W 36/00* (2009.01)
(52) U.S. Cl.
USPC .................. 455/437; 455/436; 455/422.1
(58) Field of Classification Search
USPC ................................ 455/437, 436, 422.1
See application file for complete search history.

(56) References Cited

U.S. PATENT DOCUMENTS

| 2004/0043769 A1* | 3/2004 | Amerga et al. ........... 455/437 |
| 2007/0066273 A1* | 3/2007 | Laroia et al. ............ 455/343.2 |
| 2007/0213065 A1* | 9/2007 | Kang et al. .............. 455/442 |

FOREIGN PATENT DOCUMENTS

| EP | 2031922 A2 | 3/2009 |
| RU | 2338335 C2 | 11/2008 |
| WO | 2008048022 A1 | 4/2008 |

OTHER PUBLICATIONS

"Universal Mobile Telecommunications System (UMTS): Evolved Universal Terrestrial Radio Access (E-UTRA) and Evolved Universal Terrestrial Radio Access (E-UTRAN); Overall description; Stage 2 (3GPP TS 36.300 version 8.5.0 Release 8); ETSI TS 136 300", ETSI Standard, European Telecommunications Standards Institute (ESTI)), Sophia Antipolis, Cedex, France, vol. 3-R2, No. V8.5.0, Jul. 1, 2008, XP014042193 p. 14, line 54-line 58; p. 15, figures 4-1; p. 43, figures 10.1.2.1.1-1; p. 43, line 1-line 7; p. 44, line 1-line 31.

*Primary Examiner* — Chuong A Ngo
(74) *Attorney, Agent, or Firm* — Coats & Bennett, P.L.L.C.

(57) ABSTRACT

A method in a first base station for supporting DTX is provided. The first base station serves a first cell being in an active mode. The first base station communicates with a user equipment within the first cell. The first base station is comprised in a radio communications system further comprising the user equipment and a second base station serving a second cell being in a non observable mode. The first base station sends (602) to the second base station, a request to switch the second cell state from a non observable mode to an observable mode. It further sends (603) to the user equipment or to the second base station, a request to perform signalling between the user equipment and the second base station for quality measurements. The first base station then obtains (604) information that handover is feasible, based on quality measurement of the performed signalling. The first base station sends (605) to the second base station, a request to prepare handover of the user equipment from the first cell to the second cell, and further (606) to the user equipment, a command to perform handover to the second cell.

32 Claims, 8 Drawing Sheets

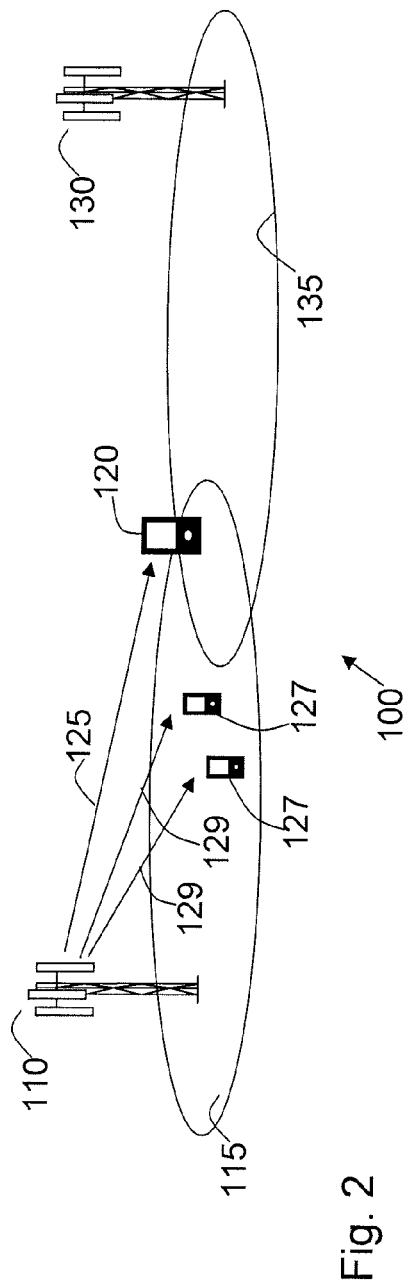
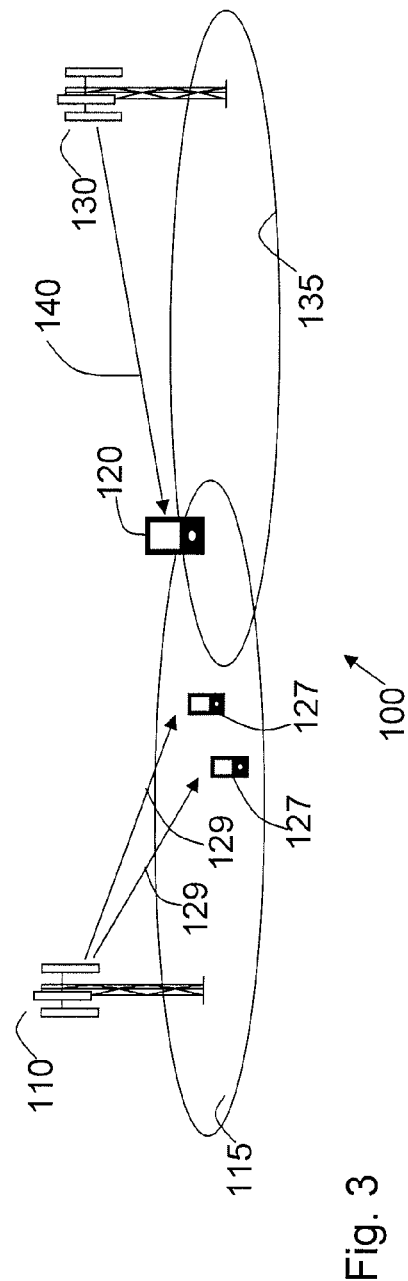

METHOD AND ARRANGEMENT IN A RADIO COMMUNICATIONS SYSTEM FOR SUPPORTING DTX

TECHNICAL FIELD

The present invention relates to a method and an arrangement in a first base station, a method and an arrangement in a second base station and a method and an arrangement in a user equipment. In particular, it relates to for supporting Discontinuous Transmission (DTX) for power saving.

BACKGROUND

In a typical cellular system, also referred to as a radio communications system, wireless terminals, also known as mobile stations and/or User Equipment units (UEs) communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-included, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies.

Being "green" has quickly gone from just a marketing hype to a key requirement for customers. This is true today for almost all sectors in society and the telecom market is no exception. The world today is facing a global energy crisis as people start to realize that our carbon based economy is no longer sustainable. Two areas that will become significant parts of a future sustainable economy are energy savings and telecommunications. Energy savings are by far the quickest and cheapest way of reducing carbon dioxide emissions to the atmosphere and telecommunication can significantly reduce the need for physical transportation of people and services. In 3rd Generation Partnership Project (3GPP) the work on the first release of the 3G Long Term Evolution (LTE) system, denoted LTE Rel-8 in 3GPP jargon, was finalized during 2008. The specifications of the next releases (denoted LTE Rel-9 and LTE Rel-10) are expected to be available 2009 and 2010 respectively. In LTE Rel-8 the maximum bandwidth is 20 MHz while in Rel-10 support for aggregation of multiple component carriers resulting in a total bandwidth of up to 100 MHz is expected to be specified, which LTE Rel-8 system and later releases of the LTE system all consume power.

SUMMARY

It is therefore an objective of the present solution to provide a mechanism enabling power saving base station operation based on DTX.

According to a first aspect of the present invention, the object is achieved by a method in a first base station for supporting Discontinuous Transmission (DTX). The first base station serves a first cell. The first cell is in an active mode. The first base station communicates with a user equipment within the first cell over a radio carrier. The first base station is comprised in a radio communications system. The radio communications system further comprises the user equipment and a second base station serving a second cell. The second cell state is in a non observable mode. The first base station sends to the second base station, a request to switch the second cell from a non observable mode to an observable mode for said user equipment 120. The first base station further sends to the equipment or to the second base station, a request to perform signalling between the user equipment and the second base station for quality measurements. The first base station then obtains information that handover is feasible. The information is based on quality measurement of the performed signalling. Upon receiving this information, the first base station sends to the second base station, a request to prepare handover of the user equipment from the first cell to the second cell. The first base station then sends to the user equipment, a command to perform handover to the second cell.

According to a second aspect of the present invention, the object is achieved by a method in a second base station for supporting DTX. The second base station serves a second cell. The second cell is in a non observable mode. The second base station is comprised in a radio communications system. The radio communications system further comprises a first base station communicating with a user equipment over a radio carrier 20 being active. After receiving from the first base station, a request to switch the second cell state from a non observable mode to an observable mode for said user equipment 120, the second base station switching the second cell state to an observable mode for said user equipment 120. After receiving from the first base station, a request to perform signalling between the user equipment and the second base station for quality measurements, the second base station signals to or from the user equipment. The second base station receives from the first base station, a request to prepare a handover of the user equipment from the first cell to the second cell. The handover request is based on quality measurement performed on said signalling. When the second cell state is in observable mode the second base station switches the second cell state to active mode, and prepares handover of the user equipment from the first cell to the second cell.

In some embodiments, base station DTX is performed within the second base station, when the second cell is in a non observable mode.

According to a third aspect of the present invention, the object is achieved by a method in a user equipment for supporting DTX. The user equipment is present in a first cell communicating over a radio carrier with a first base station serving the first cell. The first cell is set in an active mode. The user equipment and the first base station are comprised in a radio communications system. The radio communications system further comprises a second base station serving a second cell. The second cell is set in a non observable mode. The user equipment receives from the first base station, a request to perform channel sounding signalling to be observed by the second base station for quality measurements. The second base station has been requested by the first base station to switch the second cell state from a non observable mode to an observable mode for said user equipment 120. The user equipment then signals channel sounding to be observed by the second base station for quality measurements. After receiving from the first base station, a command to perform handover to the second cell, the user equipment performs the commanded handover from the first cell to the second cell. The handover command is based on quality measurement performed by the second base station on the signalled channel sounding observed by the second base station.

According to a forth aspect of the present invention, the object is achieved by an arrangement in a first base station for supporting DTX. The first base station serves a first cell. The first cell is adapted to be in an active mode. The first base station is arranged to communicate with a user equipment within the first cell over a radio carrier. The first base station is comprised in a radio communications system. The radio communications system further comprises the user equipment and a second base station serving a second cell. The second cell is adapted to be in an non observable mode. The first base station arrangement comprises a sending unit configured to send to the second base station, a request to switch the second cell state from a non observable mode to an observable mode for said user equipment 120. The sending unit is further configured to send to the user equipment or to the second base station, a request to perform signalling between the user equipment and the second base station for quality measurements. The first base station arrangement further comprises an obtaining unit configured to obtain information that handover is feasible, based on quality measurement of the performed signalling. The sending unit is further configured to send to the second base station, a request to prepare handover of the user equipment from the first cell to the second cell. The sending unit is further configured to send to the user equipment a command to perform handover to the second cell.

According to a fifth aspect of the present invention, the object is achieved by an arrangement in a second base station for supporting DTX. The second base station serves a second cell. The second cell is adapted to be in an non observable mode. The second base station is comprised in a radio communications system. The radio communications system further comprises a first base station arranged to communicate with a user equipment over a radio carrier being active. The second base station arrangement comprises a receiving unit configured to receive from the first base station, a request to switch the second cell state from a non observable mode to an observable mode for said user equipment 120. The second base station arrangement further comprises a switching unit configured to switch the second cell state from a non observable mode to an observable mode for said user equipment 120. The receiving unit is further configured to receive from the first base station, a request to perform signalling between the user equipment and the second base station for quality measurements. The second base station arrangement further comprises a signalling unit configured to signal to or from the user equipment, which signal is to be used for quality measurement. The receiving unit is further configured to receive from the first base station, a request to prepare a handover of the user equipment from a first cell served by the first base station to a second cell served by the second base station. The handover request is based on quality measurement on said signalling. The switching unit is further configured to switch the second cell state from observable mode to active mode, when the second cell state is in observable mode. The second base station arrangement further comprises a preparing unit configured to prepare handover of the user equipment from the first cell to the second cell.

According to a sixth aspect of the present invention, the object is achieved by an arrangement in a user equipment for supporting DTX. The user equipment is arranged to be in a first cell and is adapted to communicate over a radio carrier with a first base station serving the first cell. The first cell is adapted to be in active mode. The user equipment and the first base station are comprised in a radio communications system. The radio communications system further comprises a second base station adapted to serve a second cell, the second cell being arranged to be in an non observable mode. The user equipment arrangement comprises a signalling unit configured to receive from the first base station, a request to perform channel sounding signalling to be observed by the second base station for quality measurements. The second base station has been requested by the first base station to switch the second cell state from a non observable mode to observable mode. The signalling unit is further configured to signal channel sounding to be observed by the second base station for quality measurements. The signalling unit is further configured to receive from the first base station a command to perform handover to the second cell. The handover command is based on quality measurement performed by the second base station on the signalled channel sounding observed by the second base station. The user equipment arrangement further comprises a performing unit configured to perform a handover from the first cell to the second cell.

Since the first base station requests the second base station switch the second cell state from a non observable mode to an observable mode for said user equipment 120, and a requests the second base station or the user equipment to perform signalling between the user equipment and the second base station for quality measurements, handover to the second cell can be performed in spite of the second base station initially being in non observable mode, in which non observable mode power saving base station operation based on DTX is enabled.

An advantage with the present solution is that a network element can remain in low power consuming mode for a longer time. Without then present solution, a base station in DTX will have to periodically or pseudo randomly leave DTX mode to enable non-served user equipments to measure.

A further advantage with the present solution is that the time to switch up from a DTX mode to an active mode will be significantly shorter with the present solution. Since, with the present solution, the mode switch of the second base station is event triggered there is no need to wait for a periodic or pseudorandom timer to expire before entering an observable mode. Instead the second base station can switch to an observable mode for said user equipment 120 immediately after a request is received from the first base station. To enable a fast switching time with a state of the art timer based solution periodic or pseudorandom the DTX time would need to be reduced significantly and that would limit the potential energy savings.

Also with the current invention it can be avoided that the second cell unnecessarily enters an observable mode, i.e. non DTX mode, or an observing mode, i.e. non DRX mode. Each time the second cell becomes observable or starts to observe cost must paid in terms of increased energy consumption. When a handover measurement is required then that cost is well motivated, but if the second base station would enter an observable mode, i.e. non DTX mode, or an observing mode, i.e. non DRX mode periodically as in state of the art solutions then it will often be wasted energy by transmitting signals from the second base station that no user terminal is measuring on or by performing measurements in the second base station even though no user terminal is transmitting anything for the second base station to measure on.

BRIEF DESCRIPTION OF THE DRAWINGS

The invention is described in more detail with reference to attached drawings illustrating exemplary embodiments of the invention and in which:

FIG. 2 is a schematic block diagram illustrating embodiments of a radio communications system.

FIG. 3 is a schematic block diagram illustrating embodiments of a radio communications system.

DETAILED DESCRIPTION

As part of the present solution a problem will firstly be defined and discussed. To introduce energy saving features, increased support for eNB Discontinuous Transmission (DTX) is required in LTE Rel-10. Several different types of downlink DTX could be considered. In the context of LTE 3 types of Down Link (DL) DTX modes could be defined: Short DTX could be defined as DTX that is fully backwards compatible with LTE Rel-8. Basically short DL DTX is then limited to one or a few OFDM symbols in which no cell specific reference symbols need to be transmitted. Medium DTX could be defined as DTX that is non backwards compatible with Rel-8, e.g. a DTX duration longer than one sub-frame (1 ms) but shorter than a radio frame (10 ms). Finally long DTX could be defined as a DTX duration that makes a carrier invisible also for Rel-10 UEs e.g. a DTX duration equal to one or several radio frames. The long DL DTX might also be denoted eNB sleep.

Figure 1:
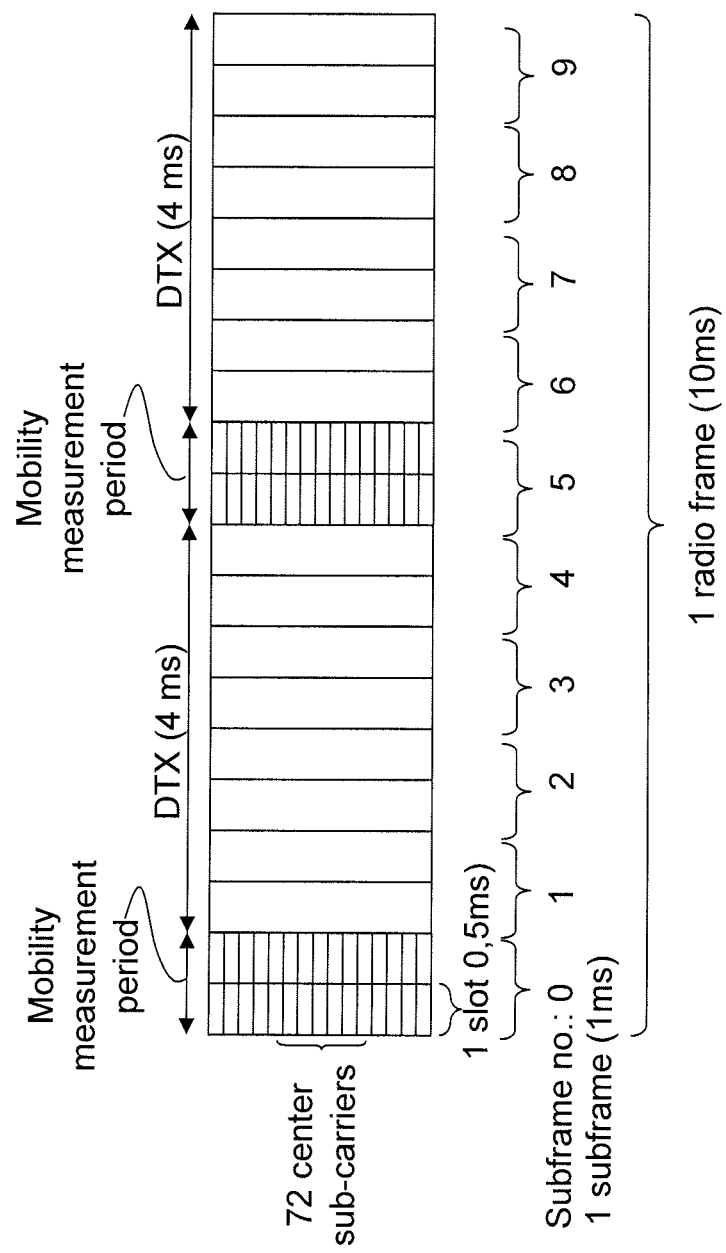
FIG. 1 is a schematic block diagram illustrating a radio frame according to prior art.

At a first glance it seems rather straightforward to introduce support for medium or long eNB DTX in LTE Rel-10. FIG. 1 shows a LTE radio frame with 72 center sub carriers, introducing eNB DTX for four ms in subframe no. 1, 2, 3, 4, 6, 7, 8 and 9. For example, the LTE Rel-10 specification may be slightly changed so that when there is little or no user plane data traffic, the eNB does not have to transmit Cell Specific Reference Symbols (CSRS) in every subframe. In this example, CSRS may only be mandatory in sub-frames 0 and 5 where also Primary Synchronization Signals (PSS) and Secondary Synchronization Signals (SSS) and Broadcast CHannel (BCH) are transmitted. CSRS also needs to be transmitted in those sub-frames that carry System Information Blocks, (SIBs). SIB1 is transmitted in the fifth sub-frame of every radio frame, SIBx where x>2 is configurable with very low duty cycle. In order for this to be allowed the UE behavior that the standard specifies may for example be changed so that UEs are only allowed to perform mobility measurements during sub-frames 0 and 5.

The fact that the CSRS are not transmitted in every sub-frame may also likely affect the Channel Quality Indicator (CQI) measurements. However already in Rel-8 it is possible to specify when in time the CQI measurements are to be performed. In Rel-8 the CQI measurements are performed 4 sub-frames before the UE are scheduled to report the CQI. No time domain filtering of CQI estimates are performed in the UE. It might be necessary to reconsider if this mechanism is sufficient also for Rel-10 or if some more flexibility is required.

In case UEs measure the CQI in sub-frames other than 0 and 5 then they can not assume that there is any frequency correlation since the eNB may not always transmit CSRS in all resource blocks. Alternatively the UEs could detect an "all zero CQI" measurement as an indication that the eNB does not need any CQI report from the UE.

UE channel estimation is also affected. A slight degradation in channel estimation accuracy is expected since UEs can not utilize time and frequency correlation between resource blocks (unless they are adjacent to subframe 0 or 5). This however is already the case for TDD, where one cannot do interpolation between all subframes as some subframes are UL subframes. Hence this is not a fundamental problem.

There are many alternatives to the solution outlined in FIG. 1. UE mobility measurements can be limited to
the centre 6 resource blocks; and/or
a single antenna port (e.g. antenna port 0) and/or
the PSS and SSS signals only; and/or
subframe 0 only, i.e. not both sub-frame 0 and 5 as in FIG. 1.

It is also possible that a future non legacy LTE release (e.g. Rel-10) defines a new set of reference symbols for non backwards compatible extension carriers. Current discussions in 3GPP mention two new sets of reference symbols: demodulation reference symbols (DM-RS) and channel state information reference symbols (CSI-RS). If new reference symbols are defined (e.g. a new set of mobility measurement reference signals of the DM-RS or CSI RS mentioned above) then it is likely that UE mobility measurements are defined on a sub-set of the new reference symbols.

To enable DTX periods longer than 4 ms one could imagine that an eNB sleep mode is also defined for LTE Rel-9 or LTE Rel-10. Periodically a sleeping eNB could transmit all signals needed for UEs to measure and attach to the cell, i.e. PSS, SSS, BCH, SIB1, SIB2, CSRS during a short active period duration such as e.g. 50 ms. The active period is then followed by a much longer inactive period such as e.g. 450 ms where nothing is transmitted from the eNB. The active period can be compatible with LTE Rel-8 or a later release, e.g. LTE Rel-10.

The problem with the energy saving solutions discussed above is that a user equipment can not access a cell being in DTX mode since a cell being in a DTX mode is invisible to this user equipment, and the serving base station will not receive any handover measurements from the user equipment that can trigger a handover.

It is therefore a further objective of the present solution to provide the means required to making it possible for a user equipment to access a cell being in a non observable cell state and therefore is not transmitting anything, or access a cell in a DTX mode not supported by the user equipment.

FIG. 2 depicts a radio communications system 100, such as e.g. the E-UTRAN, also known as LTE, LTE-Adv, 3rd Generation Partnership Project (3GPP) WCDMA system, Global System for Mobile communications/Enhanced Data rate for GSM Evolution (GSM/EDGE), Wideband Code Division Multiple Access (WCDMA), Worldwide Interoperability for Microwave Access (WiMax), or Ultra Mobile Broadband (UMB). The radio communications system 100 supports different releases of a standardized radio specification such as a standardized LTE specification or a standardized High Speed Packet Access (HSPA) specification.

The radio communications system 100 comprises a first base station 110 serving a first cell 115. The first base station 110 may be a base station such as a NodeB, an eNodeB or any other network unit capable to communicate with a user equipment being present in the fist cell over a radio carrier. The first base station 110 communicates with a user equipment 120 being present within the first cell 115 over a radio carrier 125. The first cell 115 is in an active mode, this means that the radio carrier 125 in the first cell 115 is up and running e.g. with a DTX mode supported by the user equipment 120. With active mode in this context is meant that the transmission mode of the serving cell, i.e. the first cell 115 is such that data communication is possible between the user equipment 120 and the first cell 115. Thus, as seen from the perspective of the user equipment 120, only the serving cell, i.e. the first cell 115 can be in active mode and a non serving cell, i.e. the second cell 135 can not. However a non serving cell, i.e. the second cell 135 can be in a DTX mode that is either observable or non observable for the user equipment. In the example of FIG. 2 and only for illustration, the first base station 110 further communicates with other user equipments 127 in the first cell 115 over other radio carriers 129. The user equipment 120 may be a mobile phone, a Personal Digital Assistant (PDA), or any other network unit capable to communicate with a base station over a radio channel.

The radio communications system 100 further comprises a second base station 130 serving a second cell 135. The second base station 130 may be a base station such as a NodeB, an eNodeB or any other network unit capable to communicate with a user equipment present in the second cell 135, over a radio carrier when the cell state is in active mode. However, in FIG. 2 the second cell is not in an active mode but in a non observable mode which means that the carrier within the second cell 135, seen from the user equipment 120 perspective, is not transmitting anything or it is in a DTX mode not supported by the user equipment 120. Note that it is possible to consider the case that a new DTX mode is introduced in a new release of a standardized system specification, such as 3GPP LTE. In that case only user equipments that comply with the new standard release will be able to observe a cell that is operating using the new DTX mode. Thus a DTX mode that is observable for one user equipment may be non observable for another user equipment.

The general idea of the present solution will now be described. In an exemplary scenario referred to in FIG. 2, the user equipment 120 would be better served by second base station 130 and the second cell 135. The second cell 135 being in a non observable mode is not visible for the user equipment 120.

To start a hand over procedure to hand over the user equipment 120 to the second cell 135, the first base station 110 requests the second base station 130 to switch the second cell state from a non observable mode to an observable mode for said user equipment 120. An observable mode means that from the perspective of the user equipment 120, the carrier in the second cell 135 is temporarily transmitting with a DTX mode supported by the user equipment 120 for the sole purpose of allowing mobility measurements. But neither the user equipment 120 nor any other user equipments present within the second cell 135 are actively receiving user plane data on the carrier.

The second base station 130 switches the second cell state to an observable mode for said user equipment 120. This switch makes the second cell 135 visible to the user equipment 120.

The first base station 110 then requests the user equipment 120 or the second base station 130 to perform signalling between the user equipment 120 and the second base station 130 for quality measurements.

The first base station 110 obtains information that handover is feasible, based on quality measurement of the performed signalling.

The first base station 110 then requests the second base station 130 to prepare handover of the user equipment 120 to the second cell 135, and commands the user equipment 120 to perform handover to the second cell 135.

The handover to the second cell is performed by the user equipment 110 ending up in the scenario illustrated in FIG. 3. The second base station 130 switches to active mode. The user equipment 110 and the second base station 130 may then start communicating with each other over a radio carrier.

As a consequence of the present solution in methods described above and below, a cell may request that a non observable neighboring cell becomes observable.

So e.g. when load is high a base station serving a cell may check if any neighboring cells can take over some of the traffic.

In the present solution, the mode terminology is defined from the user equipment 120 point of view. Therefore it is only the serving cell, i.e. the first cell 115 that can be in an "active" mode. A non serving cell, i.e. the second cell 135, can only be "observable" or "non observable" as far as this user equipment 120 is concerned. The second cell 135 may also be "observing" but it can not be "active", at least not until the user equipment 120 has performed a handover to the second cell 130 after which the second cell 135 is no longer referred to as the second cell 135. Furthermore, note that the term "observable" denotes that the characteristics of the radio channel between the user equipment 120 and the second base station 130 may be determined. Thus the term "observable" is used to describe both the case that the second cell 135 transmits a reference signal on which said user equipment 120 can perform mobility measurements; as well as the case that the second cell 135 is prepared for performing measurements needed for mobility decisions on a reference signal transmitted by said user equipment 120.

The user equipment 120 that is served by the first cell 115, i.e. the first cell 115 is thus in "active" mode, does not care if the second cell 135 happens to actively serve some other user equipments 127 or not. That the second cell 135 is in active mode is irrelevant unless we assume that any cell that is in active mode is automatically also observable for all user equipments in neighboring cells. That might not be the case since the second cell 135 might serve a LTE Rel-10 user equipment using a Rel-10 transmission format, hence it is in active mode as seen from this user equipment, and the user equipment in the neighboring cell might be a Rel-8 user equipment that is not capable of measuring on this format, hence the second cell is non observable as seen from this user equipment. So when reading "observable" and "non observable" it is from the viewpoint of the user equipment 120. What is observable for one user equipment (e.g. a Rel-10 user equipment) can be non observable for another user equipment (e.g. a Rel-8 user equipment). The term "observable" also refers to measuring on a specific signal that the second cell knows is being transmitted from the user equipment 120 served by the first cell 115.

Thus . . .

"active mode" is used to describe the mode of the cell currently serving the user equipment.

"non observable" or "observable" mode is used to describe if the characteristics of the radio channel between the user equipment 120 and the second base station 130 can be determined or not.

In case the second cell 135 is "non observable" the it can either be requested to become "observable" i.e. start to send reference signals according to a format that the user equipment 120 can measure on; or be prepared to measure on channel sounding transmissions from the user equipment 120. It does not matter whether the second cell 135 is "active" or not until the user equipment 120 enters the second cell 135.

Note that for the sake of simplifying the description of this invention, only the case when each cell transmits a single carrier described. In case several carriers are transmitted from a base station then it is possible to view that arrangement as several cells with one carrier allocated to each cell. Alternatively one the multicarrier arrangement can be viewed as a single cell with several carriers that are allocated to it. In the present solution, it is chosen to adopt the commonly used nomenclature that a cell transmit only one carrier and in case having multiple carrier arrangements then the additional carriers are viewed as additional cells.

Currently carrier aggregation is being defined by 3GPP as a component technology for LTE Rel-10. The idea is that a Rel-10 user equipment shall be able to aggregate several component carriers transmitted from the same base station. In that case it is not decided yet in 3GPP if a Rel-10 user equipment will view the component carriers as one cell or several cells. In case the component carriers are visible to a Rel-8 user equipments they will however be viewed as different cells by the Rel-8 user equipments. Therefore, the present solution also covers a multicarrier arrangement where a cell has several carriers assigned to it.

Cell state changes may be exchanged for example directly between the first base station 110 and the second base station 130 e.g. over X2/S1 or over an O&M interface e.g. according to a Listener/Reporter pattern. The X2 interface is, as defined in 3GPP, a direct logical interface between two eNodeBs; the S1 interface is the interface between the eNodeB and the mobility management entity (MME); the O&M interface is the interface between the eNodeB and the operation and support system (OSS). Thus a decision to enter a non observable mode may be taken locally in the base station but when the non observable mode of a carrier is changed to an observable mode for said user equipment 120, all neighboring cells, i.e. all listeners may be informed by this transmission by the first cell 135, i.e. the reporter. Also component carrier state information such as e.g. legacy/short DTX/long DTX may be exchanged between the first base station 110 and the second base station 130 and other base stations in case there are several component carriers in the first base station 110 and/or second base station 130.

Some embodiments of the present solution will now be described.

Figure 4:
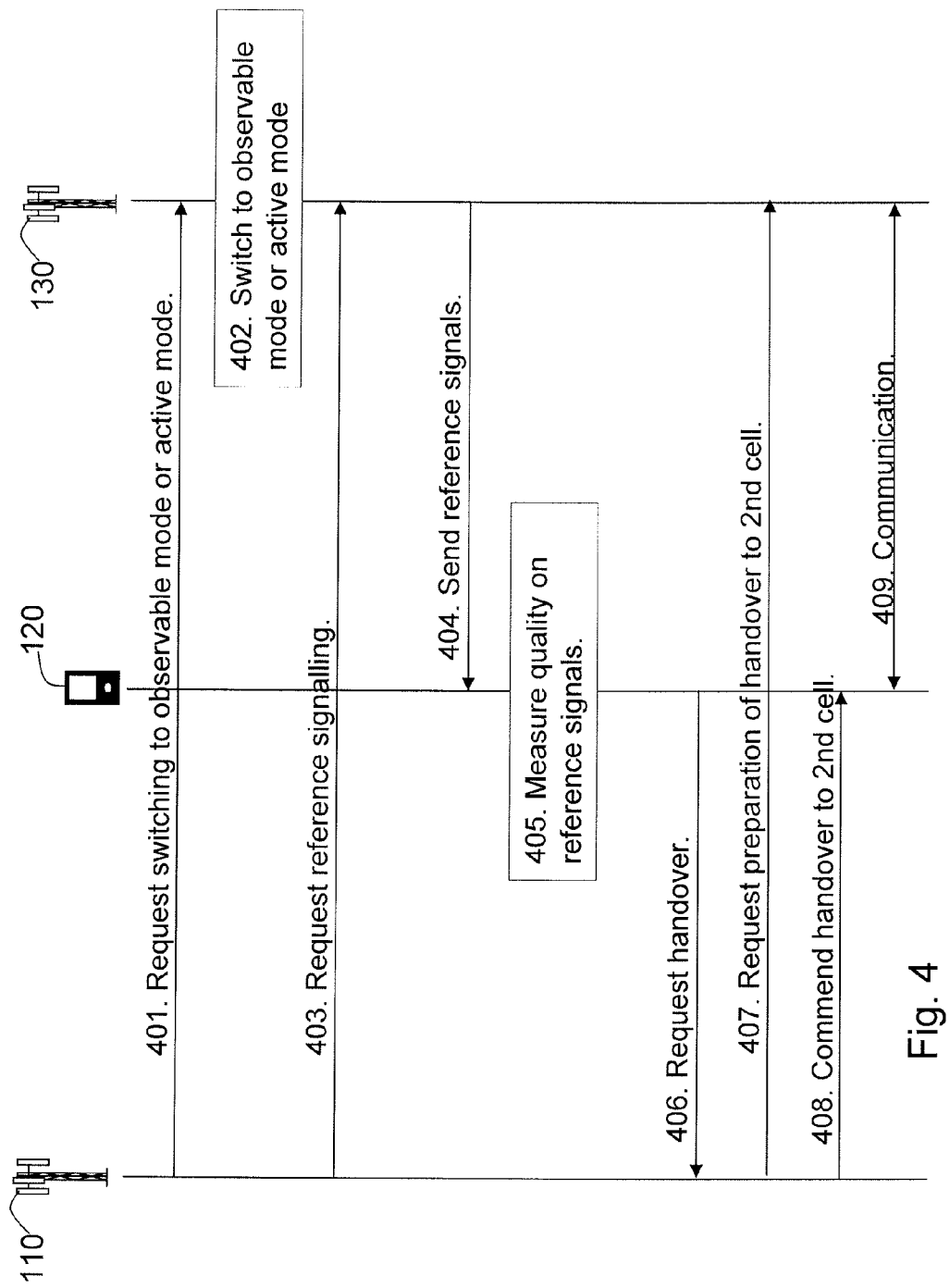
FIG. 4 is a combined schematic block diagram and flowchart depicting embodiments of a method.

A method according to some first embodiments is depicted in the combined flowchart and signaling diagram in FIG. 4. The user equipment 120 may probably be better served by the second base station 130 and the second cell 135. The second cell 135 being in a non observable mode is not visible for the user equipment 120.

The method steps below must not be taken in the order described below, but may be taken in any suitable order.

Step 401

The first base station 110 requests the second base station 130 to switch to observable mode to be able to start sending reference signals. This may be performed at the same time as the next step, or implicitly be performed by the next step. This step may e.g. be triggered by information received that the user equipment 120 requires a service that not is provided by the first base station 110. This step may also e.g. be triggered by high traffic load, such as the traffic load exceeding a predetermined threshold value.

Step 402

The second base station switches to an observable mode for said user equipment 120.

Step 403

The first base station 110 further requests the second base station 130 to perform signaling between the user equipment 120 and the second base station 130 for quality measurements. In these first embodiments this is performed by requesting the second base station 110 to start transmitting reference signals such as e.g. pilot signals.

Step 404

The second base station 130 sends reference signals.

Step 405

The user equipment 110 listens to the reference signals sent by the second base station 130 and performs quality measurements on said signals. These measurements are in LTE denoted reference signal received power (RSRP) measurements and they are used to perform handover decisions.

Step 406

When the user equipment 110 decides that handover to the second cell is feasible based on said measurements in step 404, it sends a hand over request to the first base station 110.

Step 407

The first base station 110 then requests the second base station 130 to prepare handover of the user equipment 120 to the second cell.

Step 408

The first base station 110 then commands the user equipment 120 to perform handover to the second cell 135.

Step 409

The user equipment 120 performs handover to the second cell 135 and may then start to communicate with the second base station 130.

Figure 5:
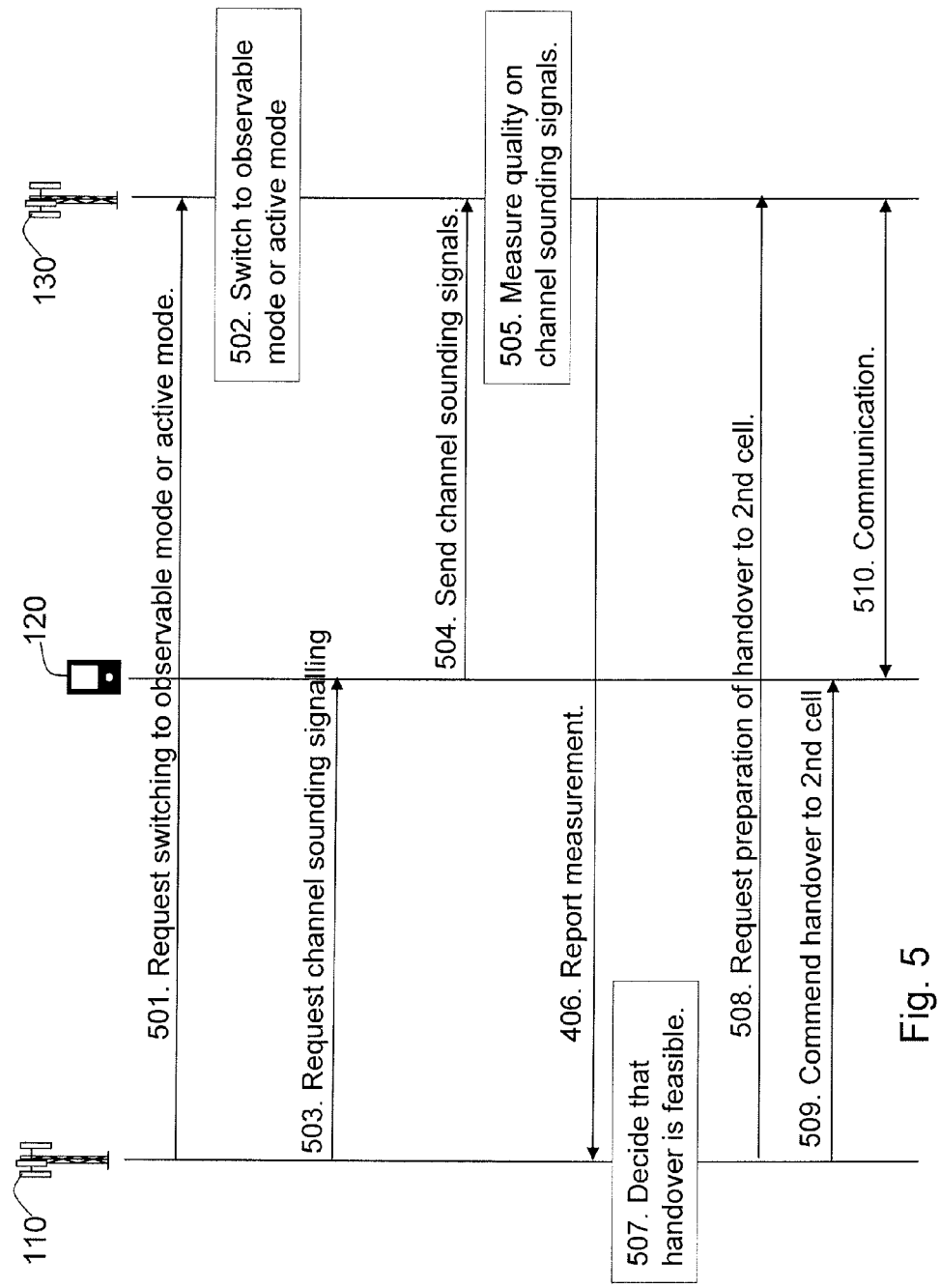
FIG. 5 is a combined schematic block diagram and flowchart depicting embodiments of a method.

A method according to some second embodiments is depicted in the combined flowchart and signaling diagram in FIG. 5. Also in these embodiments, the user equipment 120 may be better served by the second base station 130 and the second cell 135. The second cell 135 being in a non observable mode is not visible for the user equipment 120.

The method steps below must not be taken in the order described below, but may be taken in any suitable order.

Step 501

The first base station 110 requests the second base station 130 to switch to observable mode to be able to start sending reference signals. In these second embodiments this may be performed by requesting the second base station 110 to start measuring on channel sounding transmission e.g. on a particular channel sounding which is signalled by the user equipment 120. This may be performed at the same time as the next step, or implicitly be performed by the next step. This step may e.g. be triggered by information received that the user equipment 120 requires a service that not is provided by the first base station 110. This step may also e.g. be triggered by high traffic load, such as the traffic load exceeding a predetermined threshold value.

Channel Sounding Reference Signal (SRS) transmission are defined in LTE for the purpose of probing the uplink radio channel from the user equipment to the base station. The purpose of introducing SRS in LTE is to enable channel dependent scheduling also in the uplink.

Step 502

The second base station 130 switches to an observable mode for said user equipment 120, that in this case represented by an observing mode.

Step 503

The first base station 110 further requests the user equipment 120 to perform signaling between the user equipment 120 and the second base station 130 for quality measurements. In these embodiments this may be performed by commanding the user equipment 120 to transmit channel sounding signals.

Step 504

The user equipment 120 transmits channel sounding signals.

Step 505

The second base station 130 listens to the channel sounding sent by the user equipment 120 and performs quality measurements on said channel sounding signals. The received power on the channel sounding reference signal transmission from the user equipment 120 may be measured and the resulting measurement value is used by the radio network for evaluating if the user equipment 120 shall perform a handover to the second base station 130 or not.

Step 506

The second base station 130 sends measurement reports to the first base station 110, regarding the results of the quality measurements on said channel sounding signals.

Step 507

The first base station 110 reads the measurement reports from the second base station 130 and decides when it is feasible to perform handover based on the measurement report, i.e. information is obtained that it is feasible to perform handover.

Step 508

When decided that it is feasible to perform handover of the user equipment 120 to the second cell 135, the first base station 110 requests the second base station 130 to prepare handover of the user equipment 120 to the second cell.

Step 509

The first base station 110 then commands the user equipment 120 to perform handover to the second cell 135.

Step 510

The user equipment 120 performs handover to the second cell 135 and may then start to communicate with the second base station 130.

The method steps in the first base station 110 for supporting DTX, according to some embodiments will now be described with reference to a flowchart depicted in FIG. 6. As mentioned above the first base station 110 serves the first cell 115. The first cell 115 is in active mode. The first base station 110 communicates with the user equipment 120 within the first cell 115 over a radio carrier. The first base station 110 is comprised in a radio communications system, which radio communications system further comprises the user equipment 120 and the second base station 130 serving the second cell 135. The second cell state is in a non observable mode.

The method comprising the following steps, which steps may as well be carried out in another suitable order than described below:

Step 601

This is an optional step. The first base station 110 may in some embodiments detect or receive information from the user equipment 120, that the user equipment 120 requires a service that not is provided by the first base station 110. It may e.g. include subscription information such as e.g. that only high paying user equipments can wake up a micro cell.

Step 602

This step is the first step, if optional step 601 is not performed. The first base station 110 sends to the second base station 130, a request to switch the second cell state from a non observable mode to an observable mode for said user equipment 120.

In some embodiments, this step is triggered when the traffic load within the first cell exceeds a predetermined threshold value.

In some embodiments, wherein the optional step 601 is performed, this step is triggered upon receiving the information that the user equipment 120 requires a service that not is provided by the first base station 110.

Step 603

In this step the second base station 130 sends to the user equipment 120 or to the second base station, a request to perform signalling between the user equipment 120 and the second base station 130 for quality measurements.

In some first embodiments, the request to perform signalling between the user equipment 120 and the second base station 130 for quality measurements, is sent to the second base station 130, and is represented by a request to send reference signals to be measured on by the user equipment 120.

In some second embodiments, the request to perform signalling between the user equipment 120 and the second base station 130 for quality measurements is represented by a request to the user equipment 120 to transmit channel sounding signals, and a request to the second base station 130 to measure on said channel sounding signal transmission.

Step 604

The second base station then obtains information that handover is feasible, based on quality measurement of the performed signalling.

The obtained information that handover is feasible based on quality measurement of the performed signalling, may in the first embodiments be represented by a handover request from the user equipment 120 based on quality measurement of the reference signal by the user equipment 120.

In the other embodiments, the obtained information that handover is feasible based on quality measurement of the performed signalling, may be represented by receiving from the second base station 130 a measurement report based on quality measurement performed by the second base station 130 on the channel sounding signals.

Step 605

After receiving the information, the first base station 110 sends to the second base station 130, a request to prepare handover of the user equipment 120 from the first cell 115 to the second cell 135.

Step 606

The first base station 110 also sends to the user equipment 120, a command to perform handover to the second cell 135. The present method may end when this step and step 605 are performed.

Step 607

This is an optional step. In this step the first base station 110 may send to the second base station 130, information about the current first cell state, and/or receive from the second base station 110, information about the current second cell state.

Figure 7:
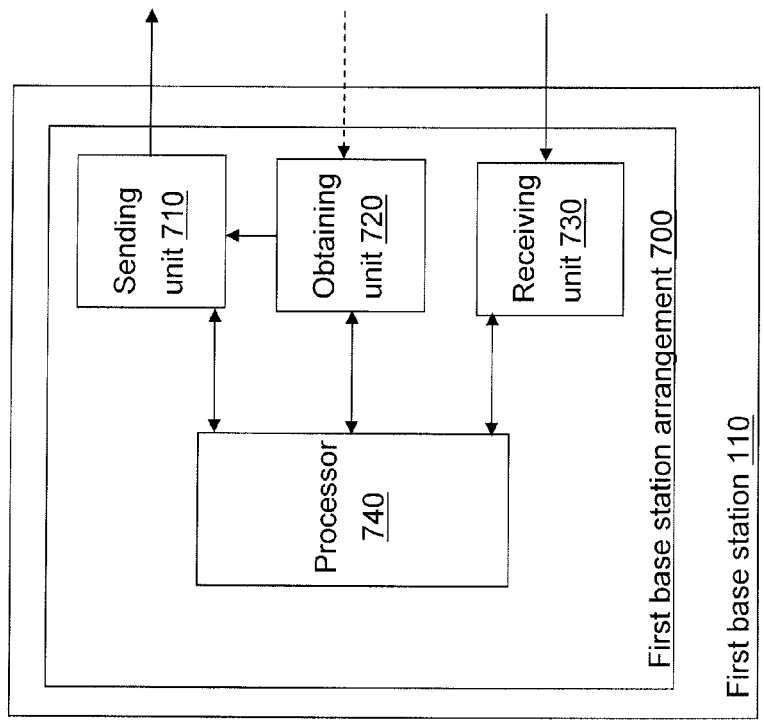
FIG. 7 is a schematic block diagram illustrating embodiments of a first base station arrangement.

To perform the method steps above for supporting DTX, the first base station 110 comprises an arrangement 700 depicted in FIG. 7. As mentioned above, the first base station 110 serves the first cell 115. The first cell state is adapted to be in active mode. The first base station 110 is arranged to communicate with the user equipment 120 within the first cell 115 over a radio carrier. The first base station 110 is comprised in the radio communications system 100. The radio communications system 100 further comprises the user equipment 120 and the second base station 130 serving the second cell 135. The sate of the second cell 135 is adapted to be in a non observable mode for the user equipment 120.

The first base station arrangement 700 comprising a sending unit 710 configured to send to the second base station 130, a request to switch the second cell state from a non observable mode to an observable mode for said user equipment 120.

The sending unit 710 is further configured to send to the user equipment 120 or to the second base station 130, a request to perform signalling between the user equipment 120 and the second base station 130 for quality measurements.

According to some first embodiments, the request to perform signalling between the user equipment 120 and the second base station 130 for quality measurements is represented by a request to the second base station 130 to send reference signals to be measured on by the user equipment 120.

According to some second embodiments, the request to perform signalling between the user equipment 120 and the second base station 130 for quality measurements is represented by a request to the user equipment 120 to transmit channel sounding signals, and a request to the second base station 130 to measure on said channel sounding signal transmission.

The sending unit 710 is further configured to send to the second base station 130, a request to prepare handover of the user equipment 120 from the first cell 115 to the second cell 135.

The sending unit 710 is further configured to send to the user equipment 120 a command to perform handover to the second cell 135.

In some embodiments, the sending unit 710 may further be configured to send to the second base station 130 information about the current first cell state.

The sending unit 710 may further be configured to be triggered to send to the second base station 130, the request to switch the second cell state from a non observable mode to observable mode, when the traffic load within the first cell exceeding a predetermined threshold value.

The first base station arrangement 700 further comprises an obtaining unit 720 configured to obtain information that handover is feasible, based on quality measurement of the performed signalling.

According to the first embodiments, the obtained information that handover is feasible based on quality measurement of the performed signalling, may be represented by a handover request from the user equipment 120 based on quality measurement of the reference signal by the user equipment 120.

According to the second embodiments, the obtain of information that handover is feasible based on quality measurement of the performed signalling, is represented by a measurement report, based on quality measurement performed by the second base station 130 on the channel sounding signals.

The first base station arrangement 700 may further comprise a receiving unit 730 configured to receive from the second base station 130 information about the current second cell state.

In some embodiments, the receiving unit 730 further is configured to receive from the user equipment 120, information that the user equipment 120 requires a service that not is provided by the first base station 110. In these embodiments, the sending unit 710 may further be configured to be triggered to send to the second base station 130, the request to switch the second cell state from a non observable mode to observable mode, said information.

Figure 8:
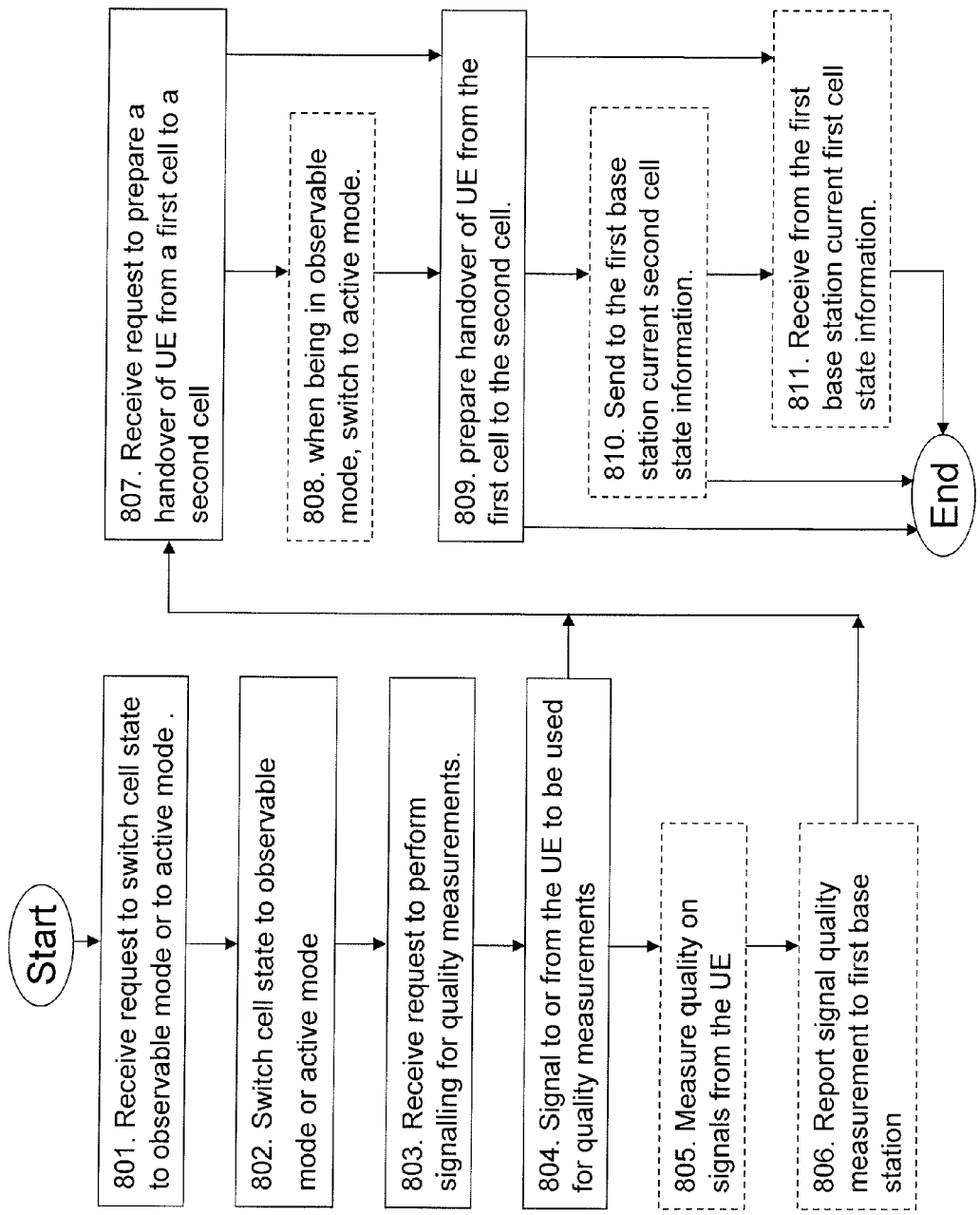
FIG. 8 is a flowchart depicting embodiments of a method in a second base station.

The method steps in the second base station 130 for supporting DTX according to some embodiments will now be described with reference to a flowchart depicted in FIG. 8. As mentioned above, the second base station 130 serves the second cell 135. The cell second cell 135 is in a non observable mode. The second base station may perform DTX, when the second cell state is in non observable mode. The second base station 130 is comprised in the radio communications system 100. The radio communications system 100 further comprises the first base station 110 communicating with the user equipment 120 over a radio carrier being active.

The method comprises the following steps that may as well be carried out in another suitable order than described below:

Step 801

The second base station 130 receives from the first base station 110, a request to switch the second cell state from a non observable mode to an observable mode for said user equipment 120.

Step 802

The second base station 130 switches the second cell state from a non observable mode to an observable mode for said user equipment 120.

Step 803

The second base station 130 receives from the first base station 110, a request to perform signalling between the user equipment 120 and the second base station 130 for quality measurements.

In some first embodiments the request to perform signalling between the user equipment 120 and the second base station 130 for quality measurements, is represented by a request to send reference signals to be measured on by the user equipment 120.

In some second embodiments, the request to perform signalling between the user equipment 120 and the second base station 130 for quality measurements is represented by a request to the second base station 130 to measure on said channel sounding signal transmission.

Step 804

The second base station 130 signals with, i.e. to or from the user equipment 120. The signal is to be used by the user equipment 120 for quality measurement.

In the first embodiments, the signalling to or from the user equipment 120, may be represented by sending the requested reference signals.

Step 805

This is an optional step relating to the second embodiments. The second base station may measure the quality on channel sounding signals observed from the user equipment 120.

Step 806

This is an optional step relating to the second embodiments. The second base station 130 sends to the first base station 110, a measurement report based on the quality measurement performed on the channel sounding signals.

Step 807

The second base station 130 receives from the first base station 110, a request to prepare a handover of the user equipment 120 from a first cell 115 served by the first base station 110 to the second cell 135 served by the second base station 130. The handover request is based on quality measurement on said signalling.

Step 808

When the second cell state is in observable mode, the second base station 130 switches the second cell state from observable mode to active mode.

Step 809

As requested, the second base station prepares handover of the user equipment 120 from the first cell 115 to the second cell 135. The present method may end at this step.

Step 810

This is an optional step. The second base station 130 may send to the first base station 110 information about the current second cell state. The present method may end at this step.

Step 811

This is also an optional step. The second base station 130 may receive from the first base station 110, information about the current first cell state. The present method may end at this step.

Figure 9:
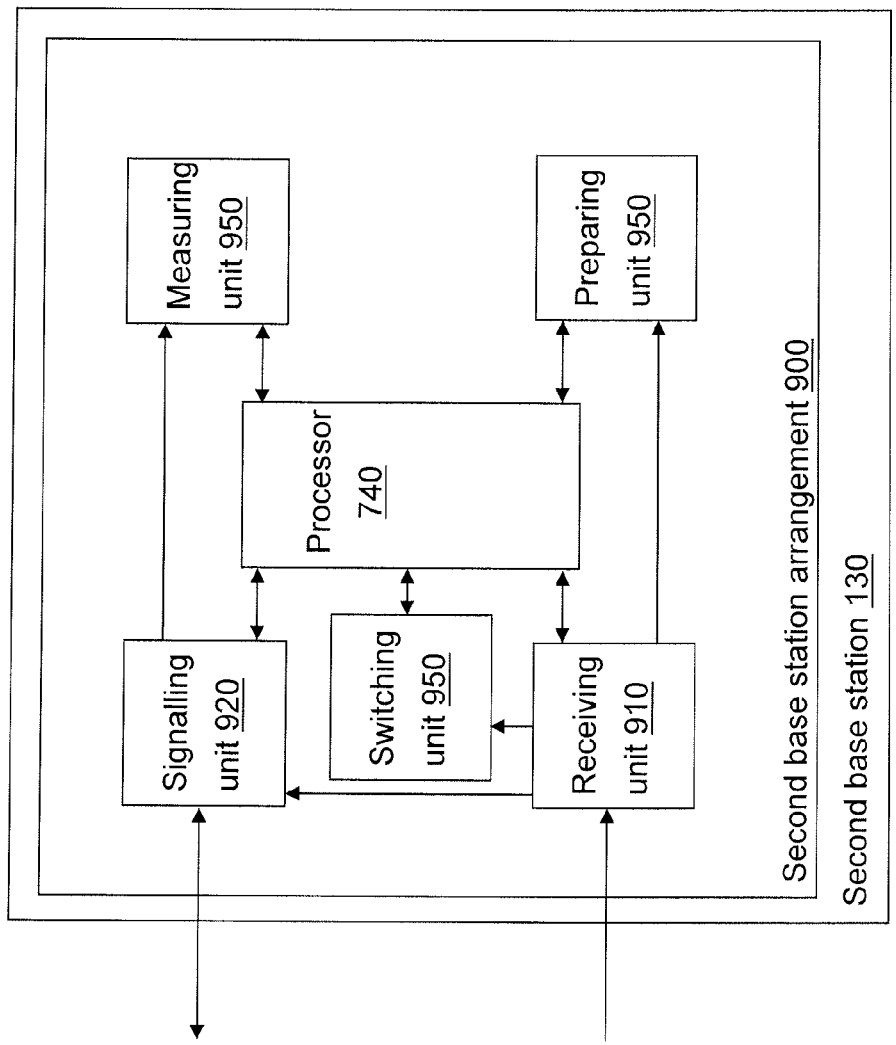
FIG. 9 is a schematic block diagram illustrating embodiments of a second base station arrangement.

To perform the method steps above for supporting DTX, the second base station 130 comprises an arrangement 900 depicted in FIG. 9. As mentioned above, the second base station 130 serves the second cell 135. The second cell 135 is adapted to be in a non observable mode for the user equipment 120. Base station DTX may be arranged to be performed within the second base station 130, when the second cell state is in a non observable mode. The second base station 130 is comprised in a radio communications system 100. The radio communications system 100 further comprises the first base station 110 arranged to communicate with the user equipment 120 over a radio carrier being active.

The second base station arrangement 900 comprises a receiving unit 910 configured to receive from the first base station 110, a request to switch the second cell state from a non observable mode to an observable mode for said user equipment 120.

The receiving unit 910 is further configured to receive from the first base station 110, a request to perform signalling between the user equipment 120 and the second base station 130 for quality measurements.

According to some first embodiments, the request to perform signalling between the user equipment 120 and the second base station 130 for quality measurements may be represented by a request to send reference signals to be measured on by the user equipment 120.

According to some second embodiments, the request to perform signalling between the user equipment 120 and the second base station 130 for quality measurements, may be represented by a request to the second base station 130 to measure on said channel sounding signal transmission.

The receiving unit 910 is further configured to receive from the first base station 110, a request to prepare a handover of the user equipment 120 from a first cell 115 served by the first base station 110 to a second cell 135 served by the second base station 130. The handover request is based on quality measurement on said signalling.

The second base station arrangement 900 further comprising a switching unit 920 configured to switch the second cell state from a non observable mode to an observable mode for said user equipment 120.

The switching unit 920 is further configured to switch the second cell state from observable mode to active mode, when the second cell state is in observable mode.

The second base station arrangement 900 further comprises a signalling unit 930 configured to signal to or from the user equipment 120, which signal is to be used for quality measurement.

According to the second embodiments, the signalling to or from the user equipment 120, may be represented by sending the requested reference signals.

The signalling unit 930 may further be configured to send to the first base station 110, information about the current second cell state.

The signalling unit 930 may further be configured to receive from the first base station 110, information about the current first cell state.

The second base station arrangement 900 further comprises a preparing unit 940 configured to prepare handover of the user equipment 120 from the first cell 115 to the second cell 135.

According to some of the second embodiments, the second base station arrangement 900 further comprises a measuring unit 950 configured to measure the quality on channel sounding signals observed from the user equipment 120.

In these embodiments, the signalling unit 930 may further be configured to send to the first base station 110, a measurement report based on the quality measurement performed on the channel sounding signals.

Figure 10:
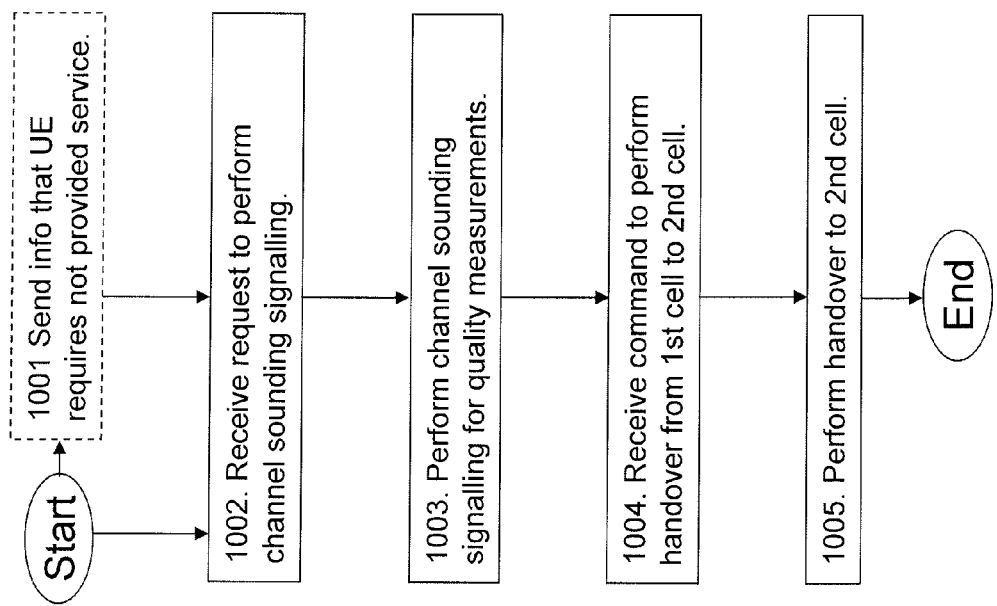
FIG. 10 is a flowchart depicting embodiments of a method in a user equipment.

The method steps in the user equipment 120 supporting DTX according to some embodiments, will now be described with reference to a flowchart depicted in FIG. 10. As mentioned above, the user equipment 120 is present in the first cell 115 and communicates over a radio carrier with the first base station 110. The first base station 110 serves the first cell 115. The first cell 115 is in an active mode. The user equipment 120 and the first base station 110 are comprised in a radio communications system 100. The radio communications system 100 further comprises the second base station 130 serving the second cell 135. The second cell 135 is in a non observable mode. The method comprises the following steps that may as well be carried out in another suitable order than described below:

Step 1001

This step is optional. According to a first embodiment, the user equipment 120 may send to the first base station 110, information that the user equipment 120 requires a service that not is provided by the first base station 110.

Step 1002

If optional step 1001 is not performed, this step starts the present method. The user equipment receives from the first base station 110, a request to perform channel sounding signalling to be observed by the second base station 130 for quality measurements. The second base station 130 has been requested by the first base station 110 to switch the second cell state from a non observable mode to observable mode.

According to the first embodiment, this step may be a response to the reception of the information received in step 1001.

Step 1003

The user equipment 120 signals channel sounding to be observed by the second base station 130 for quality measurements.

Step 1004

The user equipment 120 receives 1004 from the first base station 110 a command to perform handover to the second cell 135, which handover command is based on quality measurement performed by the second base station 130 on the signalled channel sounding observed by the second base station 130.

Step 1005

The user equipment 120 performs the commanded handover from the first cell 115 to the second cell 135.

Figure 11:
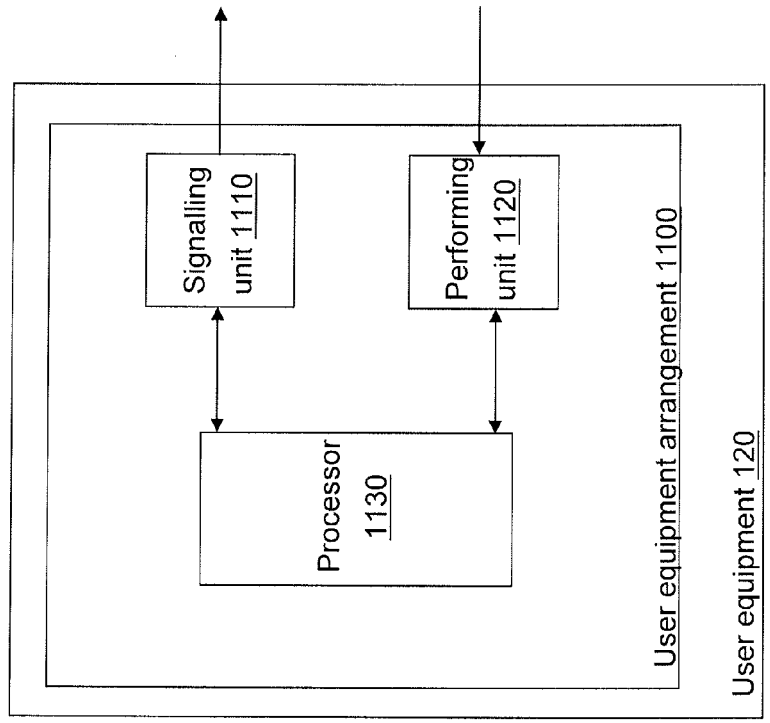
FIG. 11 is a schematic block diagram illustrating embodiments of a user equipment arrangement.

To perform the method steps above for supporting DTX, the user equipment 120 comprises an arrangement 1100 depicted in FIG. 11. As mentioned above. The user equipment 120 is arranged to be in the first cell 115. The user equipment is adapted to communicate over a radio carrier with a first base station 110 serving the first cell 115. The first cell 115 is adapted to be in active mode. The user equipment 120 and the first base station 110 are comprised in a radio communications system 100. The radio communications system 100 further comprises the second base station 130 adapted to serve the second cell 135. The second cell 135 is arranged to be in a non observable mode for the user equipment 120.

The user equipment arrangement 1100 comprises a signalling unit 1110 configured to receive from the first base station 110, a request to perform channel sounding signalling to be observed by the second base station 130 for quality measurements. The second base station 130 has been requested by the first base station 110 to switch the second cell state from a non observable mode to observable mode.

The signalling unit 1110 is further configured to signal channel sounding to be observed by the second base station 130 for quality measurements.

The signalling unit 1110 is further configured to receive from the first base station 110 a command to perform handover to the second cell 135. The handover command is based on quality measurement performed by the second base station 130 on the signalled channel sounding observed by the second base station 130.

In one embodiment, the signalling unit 1110 may further be configured to send to the first base station 110, information that the user equipment 120 requires a service that not is provided by the first base station 110.

The user equipment arrangement 1100 further comprises a performing unit 1120 configured to perform a handover from the first cell 115 to the second cell 135.

The present mechanism for supporting DTX, may be implemented through one or more processors, such as a processor 740 in the first base station arrangement 700 depicted in FIG. 7, a processor 960 in the second base station arrangement 900 depicted in FIG. 9, or a processor 1130 in the user equipment arrangement 1100 depicted in FIG. 11, together with computer program code for performing the functions of the present solution. The program code mentioned above may also be provided as a computer program product, for instance in the form of a data carrier carrying computer program code for performing the present solution when being loaded into the first base station 110, the second base station 130 or the user equipment 120. One such carrier may be in the form of a CD ROM disc. It is however feasible with other data carriers such as a memory stick. The computer program code can furthermore be provided as pure program code on a server and downloaded to the first base station 110, the second base station 130 or the user equipment 120 remotely.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appending claims.

The invention claimed is:

1. A method in a first base station for supporting Discontinuous Transmission, the first base station serving a first cell, the first cell being in an active mode, the first base station communicating with a user equipment within the first cell over a radio carrier, the first base station being comprised in a radio communications system, the radio communications system further comprising the user equipment and a second base station serving a second cell, the second cell being in a non-observable mode for the user equipment, the method comprising:

sending to the second base station, a request to switch the second cell state from non-observable mode to an observable mode for said user equipment;

sending to the user equipment a request to transmit channel sounding signals, and sending to the second base station a request to measure on said channel sounding signal transmission;

obtaining information that handover is feasible, based on a quality measurement of the performed signaling;

sending to the second base station, a request to prepare handover of the user equipment from the first cell to the second cell; and sending to the user equipment a command to perform handover to the second cell.

2. The method of claim 1 further comprising sending to the second base station information about the current first cell state.

3. The method of claim 1 further comprising receiving from the second base station information about the current second cell state.

4. The method of claim 1 wherein sending to the second base station, a request to switch the second cell state from a non-observable mode to an observable mode for said user equipment is triggered when the traffic load within the first cell exceeds a predetermined threshold value.

5. The method of claim 1 wherein sending to the second base station, a request to switch the second cell state from a non-observable mode to an observable mode is triggered responsive to receiving information from the user equipment, or detecting that the user equipment requires a service that not is provided by the first base station.

6. The method of claim 1 wherein the request to perform signaling between the user equipment and the second base station for quality measurements is sent to the second base station, and comprises a request to send reference signals to be measured on by the user equipment.

7. The method of claim 6 wherein the obtained information that handover is feasible based on a quality measurement of the performed signaling comprises a handover request from the user equipment based on a quality measurement of the reference signal by the user equipment.

8. The method of claim 1 wherein the obtained information that handover is feasible based on a quality measurement of the performed signaling comprises a measurement report received from the second base station, and based on a quality measurement performed by the second base station on the channel sounding signals.

9. A method in a second base station for supporting Discontinuous Transmission (DTX), the second base station serving a second cell, the second base station being comprised in a radio communications system, the radio communications system further comprising a first base station communicating with a user equipment over a radio carrier being active, the second cell being in an non-observable mode for the user equipment, the method comprising:
    receiving from the first base station, a request to switch the second cell state from a non-observable mode to an observable mode for said user equipment;
    switching the second cell state from the non-observable mode to the observable mode for said user equipment;
    receiving from the first base station, a request to measure on a channel sounding signal transmission of the user equipment, and measuring the quality on channel sounding signals observed from the user equipment;
    signaling to or from the user equipment, the signal to be used for quality measurement;
    receiving from the first base station, a request to prepare a handover of the user equipment from the first cell served by the first base station to the second cell served by the second base station, the handover request being based on a quality measurement on said signaling;
    switching the second cell state from the observable mode to an active mode, and
    preparing handover of the user equipment from the first cell to the second cell.

10. The method of claim 9 wherein base station DTX is performed within the second base station when the second cell state is in the non-observable mode.

11. The method of claim 9 further comprising sending to the first base station information about the current second cell state.

12. The method of claim 9 further comprising receiving from the first base station information about the current first cell state.

13. The method of claim 9 wherein the request to perform signaling between the user equipment and the second base station for quality measurements comprises a request to send reference signals to be measured on by the user equipment, and wherein signaling to or from the user equipment comprises sending the requested reference signals.

14. The method of claim 9 further comprising sending to the first base station, a measurement report based on the quality measurement performed on the channel sounding signals.

15. A method in a user equipment for supporting Discontinuous Transmission (DTX), the user equipment being in a first cell communicating over a radio carrier with a first base station serving the first cell, the first cell being in an active mode, the user equipment and the first base station being comprised in a radio communications system, the radio communications system further comprising a second base station serving a second cell, the second cell being in an non-observable mode, the method comprising:
    receiving from the first base station, a request to perform channel sounding signaling to be observed by the second base station for quality measurements, which second base station has been requested by the first base station to switch the second cell state from the non-observable mode to an observable mode for said user equipment;
    signaling channel sounding to be observed by the second base station for quality measurements;
    receiving from the first base station a command to perform handover to the second cell, the handover command being based on quality measurement performed by the second base station on the signaled channel sounding observed by the second base station; and
    performing the commanded handover from the first cell to the second cell.

16. The method of claim 15 wherein the request to perform channel sounding signaling is sent by the first base station responsive to sending to the first base station information that the user equipment requires a service that not is provided by the first base station.

17. An arrangement in a first base station for supporting Discontinuous Transmission (DIX), the first base station serving a first cell, the first cell configured to be in an active mode, the first base station being configured to communicate with a user equipment within the first cell over a radio carrier, the first base station being comprised in a radio communications system, the radio communications system further comprising the user equipment and a second base station serving a second cell, the second cell configured to be in an non-observable mode, the first base station arrangement comprising:
    a sending unit configured to:
        send to the second base station, a request to switch the second cell state from the non-observable mode to an observable mode for said user equipment;
        send to the user equipment a request to transmit channel sounding signals; and
        send to the second base station a request to measure on said channel sounding signal transmission;
    an obtaining unit configured to obtain information that handover is feasible, based on a quality measurement of the performed signaling; and
    the sending unit further being configured to:
        send to the second base station, a request to prepare handover of the user equipment from the first cell to the second cell; and
        send to the user equipment a command to perform handover to the second cell.

18. The first base station arrangement of claim 17 wherein the sending unit is further configured to send to the second base station information about the current first cell state.

19. The first base station arrangement of claim 17 further comprising a receiving unit configured to receive from the second base station information about the current second cell state.

20. The first base station arrangement of claim 17 wherein the sending unit is further configured to be triggered to send to the second base station, the request to switch the second cell state from a non-observable mode to observable mode, when the traffic load within the first cell exceeding a predetermined threshold value.

21. The first base station arrangement of claim 17 wherein the receiving unit is further configured to receive from the user equipment information that the user equipment requires a service that not is provided by the first base station, and wherein the sending unit is further configured to be triggered to send to the second base station, the request to switch the second cell state from a non-observable mode to observable mode, said information.

22. The first base station arrangement of claim 17 wherein the request to perform signaling between the user equipment and the second base station for quality measurements comprises a request to the second base station to send reference signals to be measured on by the user equipment.

23. The first base station arrangement of claim 22 wherein the obtained information that handover is feasible based on quality measurement of the performed signaling comprises a handover request from the user equipment based on the quality measurements of the reference signals by the user equipment.

24. The first base station arrangement of claim 17 wherein the obtained information that handover is feasible based on quality measurement of the performed signaling comprises a measurement report based on the quality measurement performed by the second base station on the channel sounding signals.

25. An arrangement in a second base station for supporting Discontinuous Transmission (DIX), the second base station serving a second cell, the second cell configured to be in a non-observable mode, the second base station being comprised in a radio communications system, the radio communications system further comprising a first base station configured to communicate with a user equipment over a radio carrier being active, the second base station arrangement comprising:
- a receiving unit configured to receive from the first base station, a request to switch the second cell state from a non-observable mode to an observable mode for said user equipment;
- a switching unit configured to switch the second cell state from a non-observable mode to an observable mode for said user equipment;
- the receiving unit further configured to receive from the first base station, a request to measure on said channel sounding signal transmission;
- the second base station arrangement further comprising:
  - a signaling unit configured to signal to or from the user equipment, which signal is to be used for quality measurement; and
  - a measuring unit configured to measure the quality on channel sounding signals observed from the user equipment;
- the receiving unit further configured to receive from the first base station, a request to prepare a handover of the user equipment from a first cell served by the first base station to a second cell served by the second base station, the handover request being based on quality measurement on said signaling;
- the switching unit further configured to switch the second cell state from observable mode to active mode, when the second cell state is in observable mode; and
- the second base station arrangement further comprising a preparing unit configured to prepare handover of the user equipment from the first cell to the second cell.

26. The second base station arrangement of claim 25 wherein base station DTX is configured to be performed within the second base station when the second cell state is in non-observable mode.

27. The second base station arrangement of claim 25 wherein the signaling unit is further configured to send to the first base station information about the current second cell state.

28. The second base station arrangement of claim 25 wherein the signaling unit is further configured to receive from the first base station information about the current first cell state.

29. The second base station arrangement of claim 25 wherein the request to perform signaling between the user equipment and the second base station for quality measurements comprises a request to send reference signals to be measured by the user equipment, and wherein the signaling to or from the user equipment comprises sending the requested reference signals.

30. The second base station arrangement of claim 25 wherein the signaling unit is further configured to send to the first base station, a measurement report based on the quality measurement performed on the channel sounding signals.

31. An arrangement in a user equipment for supporting Discontinuous Transmission (DTX), the user equipment configured to be in a first cell and to communicate over a radio carrier with a first base station serving the first cell, the first cell configured to be in an active mode, the user equipment and the first base station being comprised in a radio communications system, the radio communications system further comprising a second base station configured to serve a second cell, the second cell configured to be in an non-observable mode, the user equipment arrangement comprising:
- a signaling unit configured to:
  - receive from the first base station, a request to perform channel sounding signaling to be observed by the second base station for quality measurements, in which the first base station requested the second base station to switch the second cell state from the non-observable mode to an observable mode for said user equipment;
  - signal channel sounding to be observed by the second base station for quality measurements; and
  - receive from the first base station a command to perform handover to the second cell, the handover command being based on a quality measurement performed by the second base station on the signaled channel sounding observed by the second base station; and
- a performing unit configured to perform a handover from the first cell to the second cell.

32. The user equipment arrangement of claim 31 wherein the signaling unit is further configured to send to the first base station information that the user equipment requires a service that not is provided by the first base station.

* * * * *

UNITED STATES PATENT AND TRADEMARK OFFICE
CERTIFICATE OF CORRECTION

PATENT NO. : 8,639,252 B2
APPLICATION NO. : 13/319258
DATED : January 28, 2014
INVENTOR(S) : Frenger et al.

It is certified that error appears in the above-identified patent and that said Letters Patent is hereby corrected as shown below:

On the Title page, in item (56), under "OTHER PUBLICATIONS", in Column 2, Line 3, delete "Access" and insert -- Access Network --, therefor.

On the Title Page, in item (56), under "OTHER PUBLICATIONS", in Column 2, Line 6, delete "(ESTI))," and insert -- (ETSI), --, therefor.

On the Title Page, in the Figure, in Step "509.", delete "Commend" and insert -- Command --, therefor.

In the Drawings:

In Fig. 4, Sheet 3 of 8, in Step "408.", delete "Commend" and insert -- Command --, therefor.

In Fig. 5, Sheet 4 of 8, in Step "509.", delete "Commend" and insert -- Command --, therefor.

Figure 6:
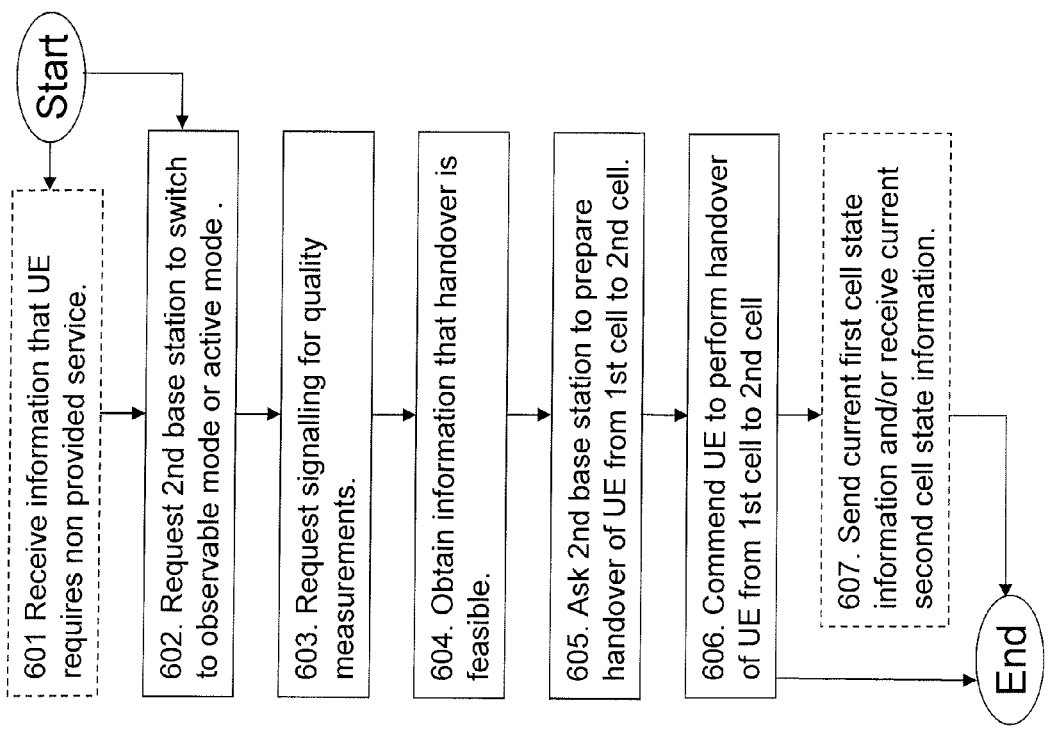
FIG. 6 is a flowchart depicting embodiments of a method in a first base station.

In Fig. 6, Sheet 5 of 8, in Step "606.", delete "Commend" and insert -- Command --, therefor.

In the Specification:

In Column 2, Line 49, delete "carrier 20" and insert -- carrier --, therefor.

In Column 3, Line 24, delete "forth" and insert -- fourth --, therefor.

In Column 7, Line 25, delete "fist" and insert -- first --, therefor.

In Column 10, Line 20, delete "that not is" and insert -- that is not --, therefor.

Signed and Sealed this
Twenty-second Day of July, 2014

Michelle K. Lee
*Deputy Director of the United States Patent and Trademark Office*

CERTIFICATE OF CORRECTION (continued)
U.S. Pat. No. 8,639,252 B2

In Column 11, Line 8, delete "that not is" and insert -- that is not --, therefor.

In Column 12, Line 14, delete "that not is" and insert -- that is not --, therefor.

In Column 12, Line 28, delete "that not is" and insert -- that is not --, therefor.

In Column 13, Line 22, delete "The sate" and insert -- The state --, therefor.

In Column 14, Line 15, delete "that not is" and insert -- that is not --, therefor.

In Column 16, Line 56, delete "that not is" and insert -- that is not --, therefor.

In Column 17, Line 45, delete "that not is" and insert -- that is not --, therefor.

In the Claims:

In Column 18, Lines 50-51, in Claim 5, delete "that not is" and insert -- that is not --, therefor.

In Column 20, Line 8, in Claim 16, delete "that not is" and insert -- that is not --, therefor.

In Column 20, Line 11, in Claim 17, delete "(DIX)," and insert -- (DTX), --, therefor.

In Column 20, Line 55, in Claim 21, delete "that not is" and insert -- that is not --, therefor.

In Column 21, Line 11, in Claim 25, delete "(DIX)," and insert -- (DTX), --, therefor.

In Column 22, Line 50, in Claim 32, delete "that not is" and insert -- that is not --, therefor.